US008141886B1

(12) United States Patent  (10) Patent No.: US 8,141,886 B1
Sugden et al.  (45) Date of Patent: Mar. 27, 2012

(54) SELECTIVELY EXTENDIBLE OPERATOR'S PLATFORM FOR STAND-ON LAWNMOWER

(75) Inventors: David J. Sugden, Horicon, WI (US); Matthew J. Mugan, West Bend, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 389 days.

(21) Appl. No.: 12/434,201

(22) Filed: May 1, 2009

Related U.S. Application Data

(60) Provisional application No. 61/049,957, filed on May 2, 2008, provisional application No. 61/096,178, filed on Sep. 11, 2008.

(51) Int. Cl.
 *B62D 63/04* (2006.01)
 *A01D 34/82* (2006.01)
 *A01D 75/00* (2006.01)
(52) U.S. Cl. ...... 280/32.5; 280/32.7; 280/291; 280/760; 56/14.7
(58) Field of Classification Search ........ 180/19.1–19.3, 180/6.2, 6.3, 6.32, 6.58; 56/10.8, 14.7; 280/35.5, 280/32.7, 87.041, 291, 298, 760, 166, 161, 280/32.5, 169
See application file for complete search history.

(56) References Cited

U.S. PATENT DOCUMENTS

| 5,117,944 | A | 6/1992 | Hurtevent |
| 5,507,138 | A | 4/1996 | Wright et al. |
| 5,809,756 | A | 9/1998 | Scag et al. |
| 5,964,082 | A | 10/1999 | Wright et al. |
| 5,984,031 | A | 11/1999 | Velke et al. |
| 6,059,055 | A | 5/2000 | Velke et al. |
| 6,085,504 | A | 7/2000 | Wright et al. |
| 6,094,897 | A | 8/2000 | Velke et al. |
| 6,138,446 | A | 10/2000 | Velke et al. |
| 6,189,304 | B1 | 2/2001 | Velke et al. |
| 6,276,486 | B1 | 8/2001 | Velke et al. |
| 6,327,839 | B1 | 12/2001 | Velke et al. |
| 6,390,225 | B2 | 5/2002 | Velke et al. |
| 6,490,849 | B1 | 12/2002 | Scag et al. |
| 6,516,596 | B2 | 2/2003 | Velke et al. |
| 6,550,563 | B2 | 4/2003 | Velke et al. |
| 6,640,526 | B2 | 11/2003 | Velke et al. |
| 6,688,090 | B2 | 2/2004 | Velke et al. |
| 6,782,964 | B1 | 8/2004 | Korthals et al. |
| 2002/0178709 | A1* | 12/2002 | Velke et al. ............. 56/10.9 |
| 2004/0103629 | A1* | 6/2004 | Velke et al. ............. 56/10.5 |
| 2008/0196374 | A1 | 8/2008 | Gamble et al. |
| 2008/0197588 | A1 | 8/2008 | Azure et al. |
| 2009/0302562 | A1* | 12/2009 | Kallevig et al. ......... 280/32.5 |

* cited by examiner

*Primary Examiner* — Ruth Ilan
(74) *Attorney, Agent, or Firm* — Boyle Fredrickson, S.C.

(57) ABSTRACT

A selectively deployable extender is provided on the rear of a platform assembly of a stand-on lawnmower so as to permit an operator to position his or her feet further from the rear wheels than would otherwise be possible in order to increase operator comfort and/or to improve traction and/or maneuverability. By making the platform selectively deployable as opposed to simply providing a longer platform, the length of the machine can be reduced for storage and transport, and the risk of making damaging contact with an obstruction or with the ground while traveling up a hill is reduced. The extender may, for instance, be a plate or similar device pivotally attached to a rear end of a main platform and the main platform can be resiliently mounted to or at least partially isolated from a frame of the stand-on lawnmower.

17 Claims, 9 Drawing Sheets

SELECTIVELY EXTENDIBLE OPERATOR'S PLATFORM FOR STAND-ON LAWNMOWER

CROSS-REFERENCE TO RELATED APPLICATIONS

This application claims priority under 35 U.S.C. §119 from U.S. Provisional Patent Application Ser. No. 61/049,957, filed on May 2, 2008 and entitled "STAND-ON LAWNMOWER," and from U.S. Provisional Patent Application Ser. No. 61/096,178, filed on Sep. 11, 2008 and entitled "SELECTIVELY EXTENDIBLE OPERATOR'S PLATFORM FOR STAND-ON LAWNMOWER," both of which are herein expressly incorporated by reference in their entireties, for all purposes.

BACKGROUND OF THE INVENTION

1. Field of the Invention

The invention relates to a lawnmower and, more particularly, to a self-propelled lawnmower that a user stands upon while operating.

2. Discussion of the Related Art

Lawnmowers equipped with dual hydraulically-powered drive systems that propel the drive wheels on each side of the mower are known in the lawn grooming or lawn care industries. Turning is achieved by driving each drive wheel at different speeds. They can even be turned in different directions for a very sharp or even a "zero-turn" radius, where the mower pivots about the midpoint drive wheel axis. Such zero-turn mowers can be configured as walk-behind, riders, or stand-on versions. For many implementations, the stand-on versions of zero-turn mowers prove more desirable.

For example, a user of a stand-on zero-turn mower does not have to expend energy walking, as required when using walk-behind mowers, which can be beneficial when mowing large expanses of land. As another example, a user of a stand-on zero-turn mower does not have to climb into and out of a seat that is mounted above a mower deck, as required when using rider mowers, which can be important when mowing areas with accumulated debris that must be removed manually and frequently. In other words, a user of a stand-on zero-turn mower can quickly mount and dismount the mower by merely stepping onto or off from a riding platform.

Several such riding platforms are known, all of which are at least partially suitable for their intended uses, while having at least some disadvantages.

For example, U.S. Pat. Nos. 5,507,138; 5,600,944; and 5,765,347 all entitled "Power Mower with Riding Platform for Supporting Standing-operator," disclose riding platforms that support standing occupants or operators. Each riding platform is located between the hydraulic motors which rotate first and second rear drive wheels. In this configuration, the operator stands directly over a central turning point or turning axis of the stand-on mower, whereby the operator is unaffected by centrifugal forces created while turning the mower.

Notwithstanding the advantages of, e.g., imparting no centrifugal forces to an operator, stand-on mowers with riding platforms positioning operators upon turning axes have numerous drawbacks. A drawback of this type of riding platform is that the width dimension is limited by the space between the hydraulic motors that extend axially from the wheels, inwardly toward the operator. Or, if the riding platform extends underneath the hydraulic motors so that the platform is wider than the space between them, then the usable width of the riding platform is limited by the space between the hydraulic motors. Riding platforms that position operators directly upon turning axes will have either actual widths, or usable widths, that correspond to distances between the respective ends of the hydraulic motors. By limiting the actual and/or usable widths of riding platforms in such a manner, the overall usable surface area of each riding platform is correspondingly reduced or limited, which can hinder foot maneuverability or limit the number of standing positions. This can cause or aggravate operator fatigue during extended periods of use.

Another drawback is that the operators have limited options for laterally adjusting their foot position which at times requires them to assume a relatively narrower stance than they desire. For example, when mowing across a side hill, an operator can experience sensations of being unbalanced or unstable if they assume an overly narrow foot placement stance. In response, operators tend to pull against, push against, or otherwise utilize the mower hand controls to stabilize themselves, which can unduly stress the hand controls, reducing their use life.

Another drawback experienced during off-camber mowing, such as when mowing across a side hill, is that the drive wheel that is elevated, or on the high side of the hill, can lose traction because not enough weight of the machine or operator is transferred through it to the ground. Some attempts have been made to reduce such traction loss at the upper wheels by, for example, providing elevated narrow platforms laterally outside of the riding platform, yet still between the drive wheels. However, using such elevated platforms requires operators to position their feet at different heights or on different planes which can at times be awkward. Positioning these platforms in alignment with the turning axis also does nothing toward solving a related problem resulting from locating the center of gravity relatively close to the front wheels, which makes turning more difficult. For ideal turning, the center of gravity of the machine as a whole should be closer to the rear turning radius than is the case on previously available stand-on lawnmowers. This is most easily observed when traveling on a side hill in which gravity acting on the front of the lawnmower tends to pull the front of the vehicle downhill.

Another drawback is that these types of riding platforms position the operators' feet immediately adjacent the hydraulic motors. If the operators place their feet at the outer lateral edges of the riding platforms, then their feet will either touch or nearly touch portions of the hydraulic motors. This can be problematic because during use, hydraulic motors can become very warm or hot, whereby the heat dissipated therefrom can at times lead to operator discomfort.

Another drawback is that these types of riding platforms position the front of the operators' legs immediately adjacent the hydraulic pumps. A typical stand-on mower incorporates the hydraulic pumps behind the engine, between the rearward portion of the engine and the shins, knees, or other portion(s) of the operator's legs. Some stand-on mowers have a riding platform that extends partially below the hydraulic pumps, whereby parts of the operator's feet are positioned below the pumps during use. This ensures that the operator will stand upon the turning axis, but also requires that part of the operator's legs be adjacent or occasionally even touch portions of the hydraulic pumps. Similar to hydraulic motors, hydraulic pumps become very warm or hot during use, whereby the heat dissipated therefrom can at times lead to operator discomfort.

Other stand-on mowers include riding platforms that position operators behind the mower turning axes, while still presenting various drawbacks. For example, U.S. Pat. No. 5,809,756, entitled "Lawn Mower Usable in Both Riding and Walk-behind Modes," discloses a riding platform that supports a standing operator behind a turning axis of the mower. The riding platform is hinged at its front edge, connecting it to a rear portion of the mower frame. The hinged attachment of the riding platform allows it to be pivoted up and stowed against the mower while providing adequate clearance between the drive wheels for the operator to walk behind the mower without striding into the riding platform. This configuration requires short platform sidewalls so that the platform can fold up snugly against the mower frame. A drawback of this riding platform is that the short platform sidewalls expose the operator's feet, ankles, and legs to the rotating drive wheels and/or other hazards during use. Operators also have a limited range of positioning relative to the steering devices. The feet of an unusually tall operator and/or an operator with unusually long arms may be positioned in a location that results in substantial discomfort when operating the lawnmower. Simply providing a longer than-usual platform is not an attractive option because a longer platform is more apt to hit the ground when transitioning from level ground to a steep hill or trail or ramp or traveling a curb, potentially damaging the platform or the structure which is contacted by it.

Another drawback is that these types of riding platforms can transfer vibrations, or shock-type or other loads, that are generated by the lawnmower during use or that result from driving the lawnmower across uneven terrain, into the legs and bodies of the operators. Exposure to such vibrations, or shock-type or other loads, can hasten an onset of operator fatigue.

SUMMARY OF THE INVENTION

In light of the foregoing, a riding platform is desired that improves the state of the art by overcoming the aforesaid problems of the prior art.

It is also desired to provide a riding platform that provides a larger surface area upon which the operator stands, increasing the foot maneuverability and number of standing positions that the operator can assume during long periods of use, yet that does not unduly increase the overall length of the lawnmower during transport or travel up a hill or over a potential obstruction It is also desired to provide a stand-on mower incorporating a riding platform that increases operator comfort while standing, and utilizes the body weight of the operator to enhance traction of the drive wheels.

It is also desired to provide a method of operating a mower that includes at least some of the steps in accordance with the foregoing summary.

In accordance with an aspect of the invention, at least some of these desires are fulfilled by providing a stand-on mower that has a riding platform assembly that extends between and rearwardly from a pair of drive wheels and whose length is selectively extendable. The riding platform assembly includes a platform defining a front portion that lies below an axis of rotation of the drive wheels, and a standing portion extending longitudinally rearward from the front portion. In other words, the standing portion interfaces the front portion and extends in a direction away from the stand-on mower. A selectively deployable extender is provided on the rear of the platform assembly so as to permit an operator to position his or her feet further from the rear wheels that would otherwise be possible in order to increase operator comfort and/or to improve traction and/or maneuverability. By making the extender selectively deployable as opposed to simply providing a longer platform, the length of the machine can be reduced for storage and transport, and the risk of making damaging contact with an obstruction or with the ground while traveling up a hill is reduced. The extender may, for instance, be a plate or similar device pivotally mounted to a rear end of a main platform of the assembly.

In accordance with another aspect of the invention, the lawnmower is steered using a system that handlebar or yoke based, optionally using a lever based system.

In accordance with another aspect of the invention, the lawnmower includes a stationary support assembly that is fixedly attached to the frame. The main platform is suspended from or at least partially movable with respect to the stationary support assembly. For example, the main platform can resiliently move in response to or dampen use-induced loads that are transferred through the riding platform assembly and onto the legs of a standing user. Accordingly, the riding platform assembly can reduce intensity levels of such loads before they are transferred to the legs of the standing user during use of the stand-on lawnmower. A front portion of the main platform can be pivotally attached to the stationary support and a rear portion of the main platform can resiliently move in response to or dampen loads that are transferred through the riding platform. For example, the main platform may pivot about an axis that extends transversely across the riding platform assembly, whereby the rear portion of the main platform moves up and down along an arcuate travel path. In some embodiments, at least one spring can at least partially support the main platform on the stationary support assembly.

In one embodiment, the spring can be a compression spring that extends between the stationary support assembly and the main platform. The spring can be retained on the stationary support between a lower spring support and an upper spring support on the main platform.

The suspension assembly may interact with an operator's presence detector switch, in which case the platform can biased to position in which it is spaced from an upper end of the compression spring if no operator is standing on the riding platform. In this default position, the platform is biased to a position in which the operator's presence detector switch is closed to prevent operation of at least some aspects of the mower, such as the engine or at least the cutter deck. The switch opens to allow mower operation when the operator steps on the riding platform, and additional motion of the riding platform compresses the spring.

In accordance with yet another aspect of the invention, the extender pivots about an axis that is parallel to and extends above the main platform. The extender can include a longitudinally extending flange that is adjacent an outer edge of the extender, and such flange can be pivotally connected to the main platform. When the extender is pivoted into a stowed position, it can be inverted and overlie at least a portion of the main platform. In this stowed position, the extender can be vertically spaced from the main platform, defining a clearance therebetween. Such clearance can accommodate at least a portion of an operator's foot therein.

In accordance with yet another aspect of the invention, the mower includes a steering assembly that can be accessed and operated by an operator while standing on the riding platform. The steering assembly may be either a handle assembly that rotates about generally vertical axis and pivots about a generally horizontal axis or left and right pivoting steering levers, each of which controls the speed and direction of motion of one of the rear drive wheels.

BRIEF DESCRIPTION OF THE DRAWINGS

The drawings illustrate a preferred and exemplary embodiment of the invention.

In the drawings.

DETAILED DESCRIPTION OF THE PREFERRED EMBODIMENTS

Figure 1:
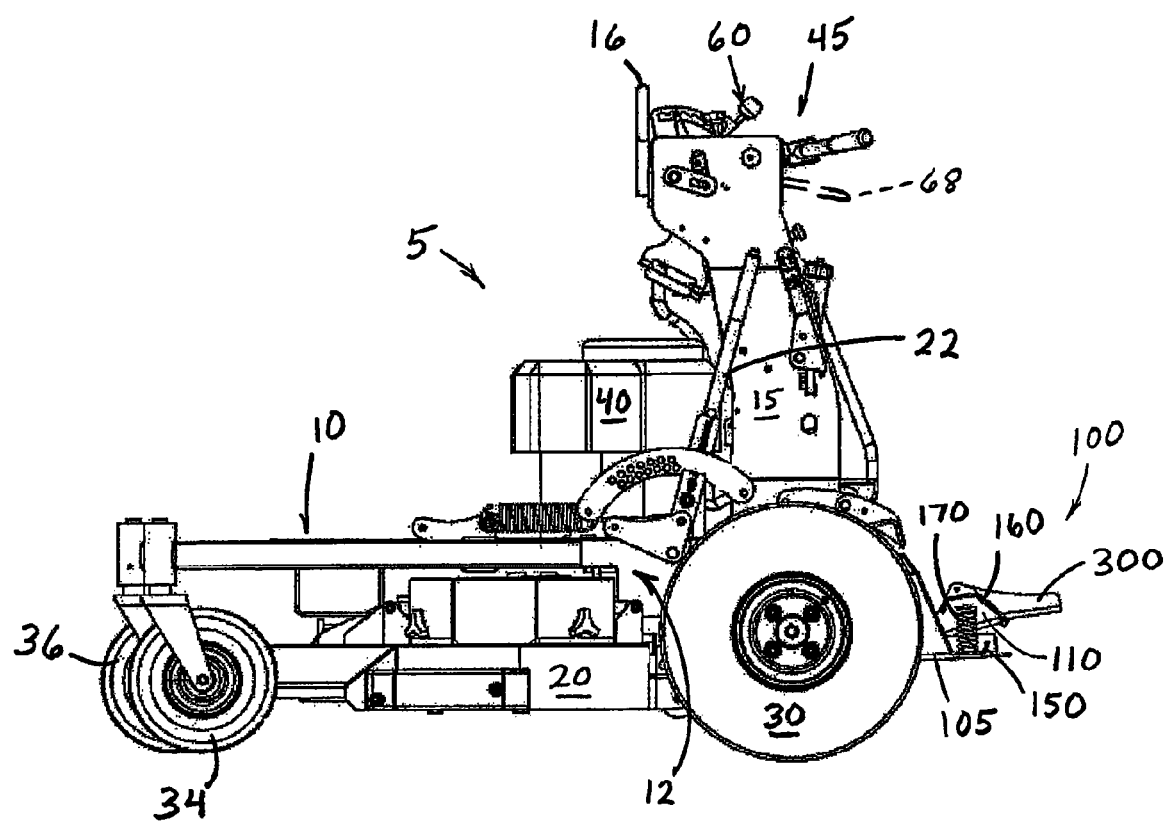
FIG. 1 is a left-side elevational view of a stand-on lawnmower equipped with a riding platform according to the present invention with the extender deployed.

The drawings illustrate a preferred exemplary embodiment of the invention as incorporated into a stand-on zero-turn lawnmower, e.g., stand-on mower 5. However, it is to be understood that the concepts discussed herein could apply to other stand-on utility vehicles as well. With respect to the embodiment of a stand-on mower illustrated in the accompanying drawings, it will be appreciated that like reference numerals represent like parts throughout the drawings.

Referring to FIGS. 1-5, a stand-on, self-propelled zero-turn lawnmower, e.g., stand-on mower 5, includes a chassis 10 having a frame 12 with uprights 15 extending upwardly from a rearward portion thereof. A stabilizing bar 16 extends between and connects the upper ends of uprights 15. Mower deck 20 is supported by frame 12 and can be a multi-blade cutting deck 20, including multiple rotating cutting blades that are positioned and driven in a conventional manner. It is noted that deck 20 could alternatively be a single blade cutting deck. Deck 20 is movably attached to frame 12, thereby allowing a user or operator to set a distance of deck 20 from a cutting surface to provide a number of desired cutting heights. To this end, a deck adjustment lever 22, which is part of a deck height and leveling assembly, allows an operator to raise and lower deck 20 as desired. A suitable deck height and leveling assembly is seen in U.S. Pat. No. 7,478,689 which issued from U.S. application Ser. No. 11/689,341, filed Mar. 21, 2007, and entitled "Vehicle Steering and Speed Control" which is incorporated herein by reference in its entirety. Deck 20 is provided between a pair of independently driven drive wheels 30 and 32 and a pair of casters 34, 36, at the rearward and forward portions of the chassis 10, respectively.

Still referring to FIGS. 1-5, drive wheels 30, 32 are operatively connected to an engine 40 while casters 34, 36 are undriven and are pivotally attached to a front portion of frame 12. Engine 40 sits on the frame 12, above the deck 20, in front of the uprights 15. A control system 45 thereon is supported on the upper ends of the uprights 15. An operator manipulates control system 45 to convert the engine power into the desired tasks and operations of stand-on mower 5.

Figure 4:
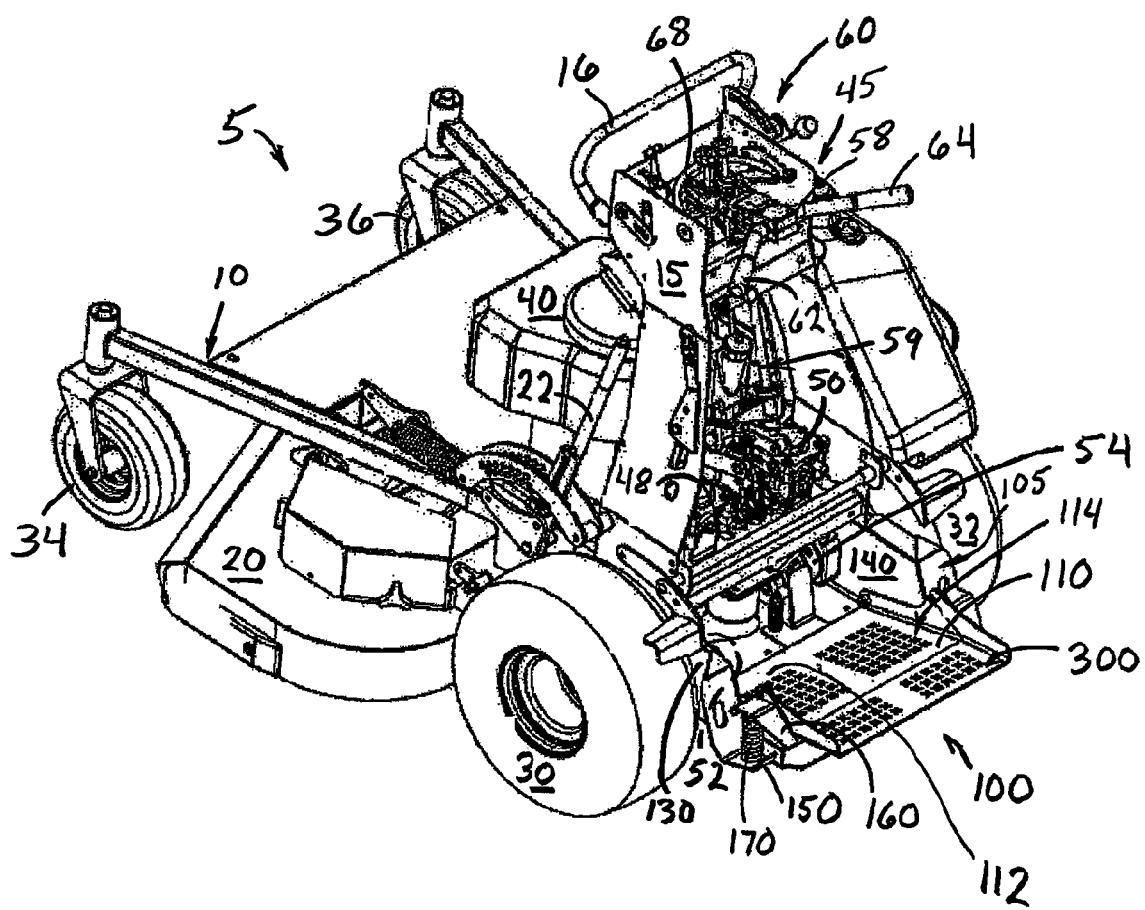
FIG. 4 is an isometric view of the stand-on lawnmower shown in FIG. 1 with some cover plates removed.
Figure 5:
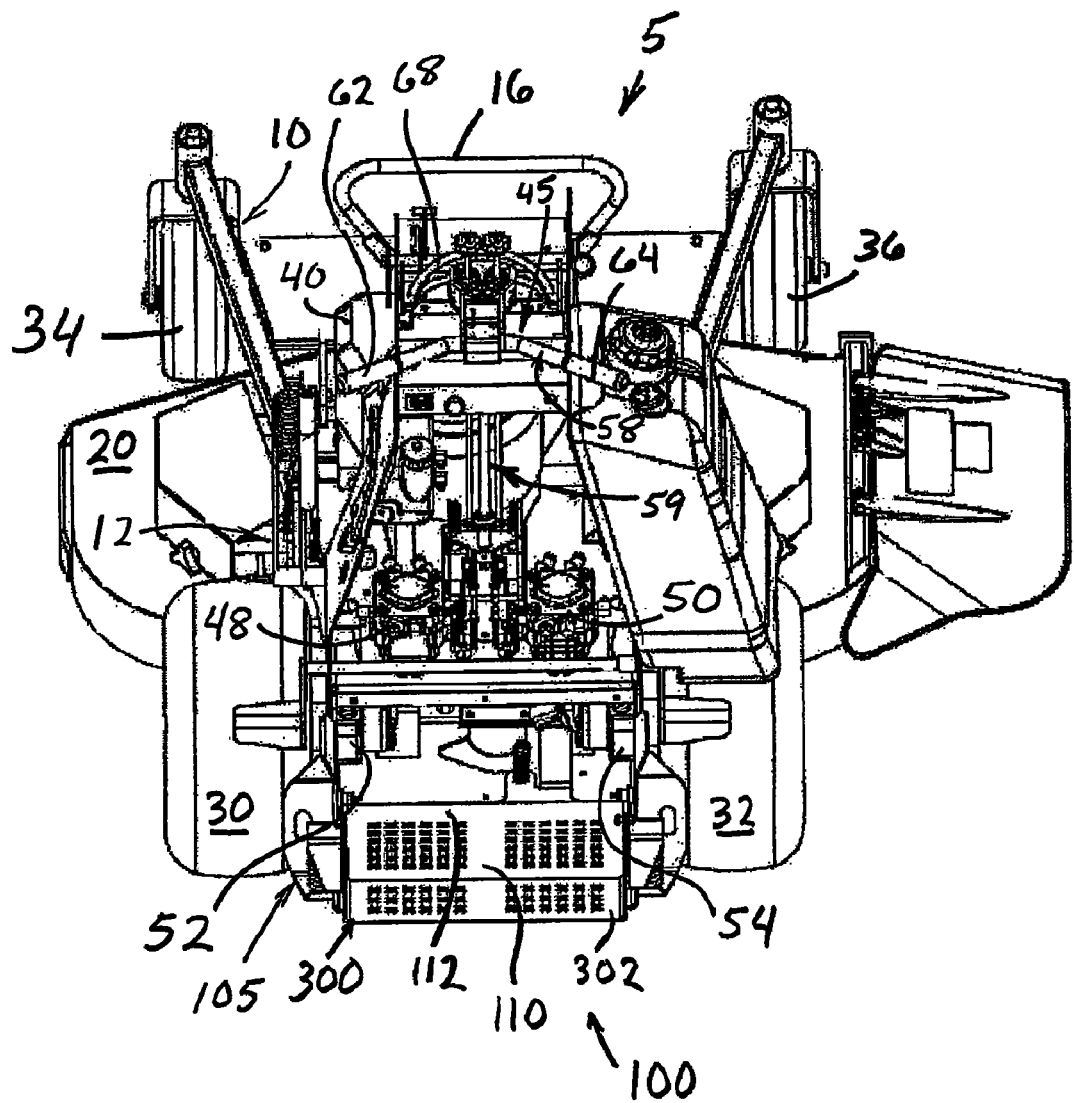
FIG. 5 is a rear elevational view of the stand-on lawnmower shown in FIG. 1 with some cover plates removed.

Referring specifically to FIGS. 4 and 5, a pair of variable flow hydraulic displacement pumps 48, 50 are positioned above a turning axis defined axially between drive wheels 30 and 32. Pumps 48, 50 provide the hydraulic pressure for rotating the drive wheels 30 and 32, respectively. Each hydraulic pump 48, 50 is mechanically and fluidly connected to an impeller of a hydraulic, low speed, high-torque motor 52, 54 that drives the associated drive wheel 30, 32. Collectively, each side pair of a pump 48, 50 and a motor 52, 54 forms a drive of stand-on mower 20, whereby pump 48 and motor 52 form a first drive and pump 50 and motor 54 form a second drive. Preferably, each hydraulic pump 48, 50 is an axial-piston type pump which includes an internal tilting swash plate (not shown) which can be rotated to vary the pump discharge rate from a zero flow, also referred to as neutral, up to a maximum flow in either the forward or reverse directions. A pair of calibration bodies or other suitable tuning controls cooperate with the pumps 48, 50, allowing an operator to calibrate the output of each respective pump 48, 50 so that stand-on mower 5 moves in a straight line when no turning function is being performed.

Still referring to FIGS. 4 and 5, control system 45 can include a yoke or handlebar 58 that has first and second grip portions 62, 64. Handle bar 58 cooperates with the swash plate actuators of the left and right pumps 48, 50 by linkages within a steering linkage assembly 59 that result in forward, rearward, and/or turning motion of the lawnmower depending on the direction and magnitude of handle movement. For instance, pivoting of the handlebar 58 about a horizontal axis upwardly or downwardly from a neutral position may result in reverse or forward propulsion of the lawnmower at speed proportional to the magnitude of pivoting. Pivoting of the handlebar 58 about a vertical axis may result in turning of the lawnmower to the left or the right. This is accomplished by controlling the pump 48, 50 operation(s) with the handlebar 58, preferably by various mechanical linkages. In other words, handlebar 58 can be operably coupled to the pumps 48, 50 by way of the steering linkage assembly 59.

Steering linkage assembly 59 can include a vertical steering shaft and first and second drive rods, on opposing sides of the steering shaft, which are connected to lever assemblies or control inputs of the pumps 48, 50. In this configuration, during use, handlebar 58 actuates the steering shaft and drive rods of the steering linkage assembly 59, correspondingly controlling the operation of the pumps 48, 50.

Continuing to refer to FIGS. 4 and 5, handlebar 58 cooperates with reference bar 68 to determine or limit a maximum forward speed of the stand-on mower 5. The reference bar 68 is preferably shaped to cause the stand-on mower 5 to automatically decelerate through a turn. The reference bar 68 can be provided in front of the handlebar 58 so that it interfaces with a front portion thereof, as seen in FIGS. 4 and 5. Optionally, the reference bar can be provided below and toward the rear of handlebar 58 (seen in dashed outline in FIG. 1). A suitable control system 45 that includes such features and corresponding functions is seen in U.S. Pat. No. 7,478,689 entitled "Lawnmower Control System", which is incorporated herein by reference in its entirety.

Figure 6:
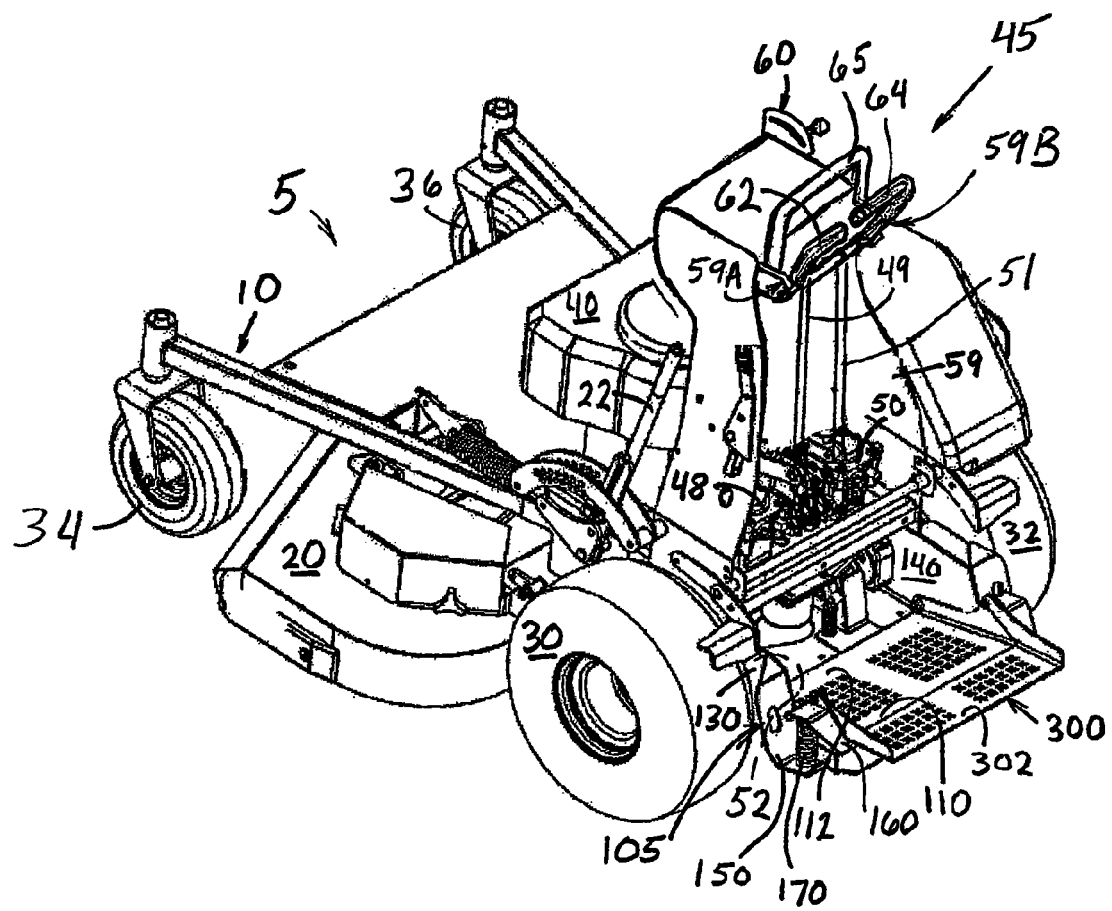
FIG. 6 is a pictorial view of a variant of the stand-on lawnmower shown in FIG. 1, incorporating a lever-type steering system with multiple levers, without the cover plate being installed.
Figure 7:
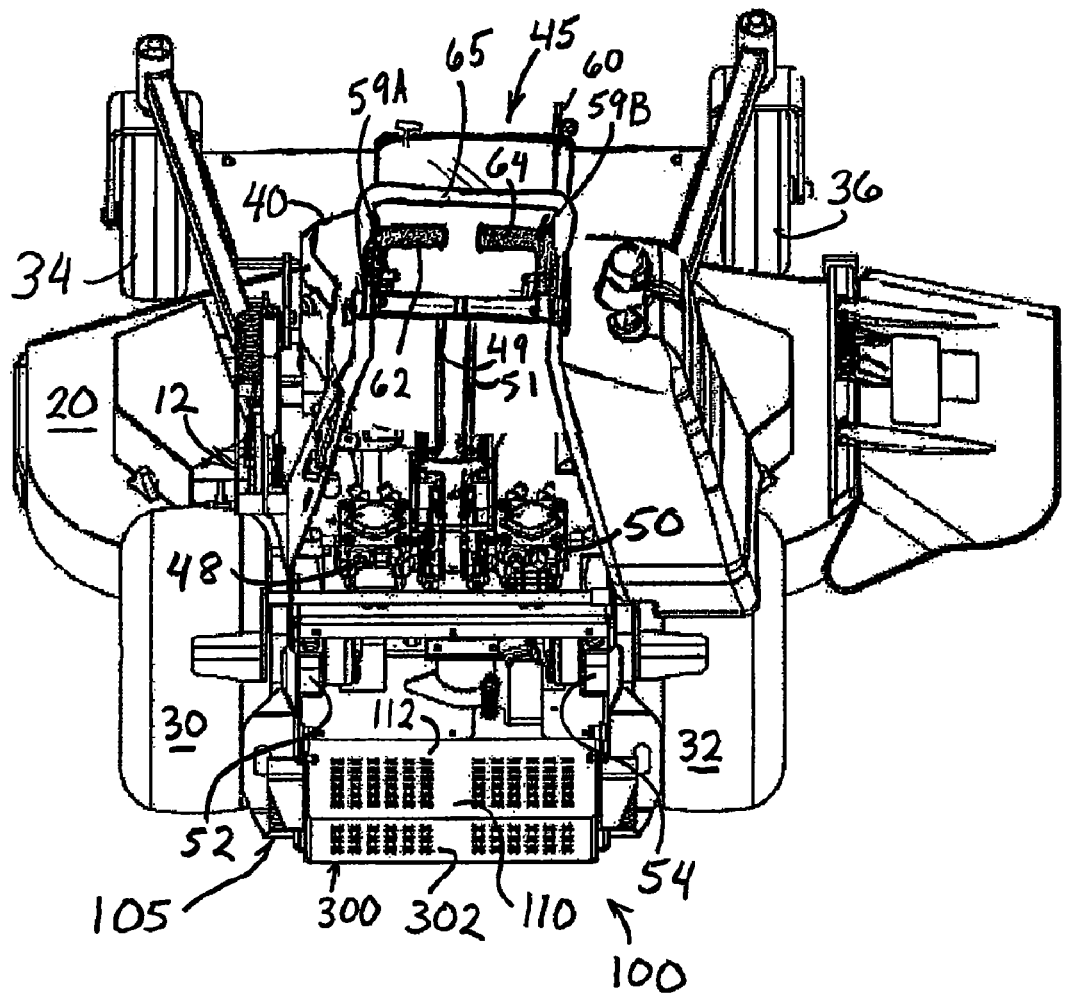
FIG. 7 is a rear elevation of the stand-on lawnmower shown in FIG. 6.

Referring now to FIGS. 6 and 7, in some embodiments, controls system 45 includes multiple manipulatable components instead of a single unitary manipulatable component like handlebar 58. For example, control system 45 can include first and second pump linkages 49 and 51 that are connected, at first ends, to the control inputs or calibration bodies of the pumps 48 and 50, respectively. Pump linkages 49 and 51 extend upwardly from the pumps 48 and 50 and connect, at their second ends, to left and right levers 59A and 59B, respectively. The left and right levers 59A and 59B have grip portions 62 and 64 that are grasped and manipulated by the operator to control the stand-on mower 5, such that (i) moving the grip portion 62 of the left handlebar assembly 59A controls the left pump 48, motor 52, and drive wheel 30, and (ii) moving the grip portion 64 of the right handlebar assembly 59B controls the right pump 50, motor 54, and drive wheel 32.

Preferably, grip portions 62 and 64 can pivot forwardly and rearwardly about a common axis that extends through bottom portions of the left and right levers 59A and 59B. During such pivotal movements, a direction of travel of the grip portion 62 or 64 corresponds to a rotational direction of the respective drive wheel 30 or 32. Distances traveled by the grip portion 62 or 64 during such pivotal movements corresponds to rotational speed of the drive wheel 30 or 32.

Zero-turn radius maneuvers can be accomplished by pivoting or moving the grip portions 62 and 64 the same distance from a center or neutral position, but in opposing directions. Or, more gradual or radiused turns can be performed while traveling forward or in reverse by pivoting or moving the grip portions 62 and 64 in the same direction but different distances. In this manner, the grip portion 62 or 64 that is moved further from its center or neutral position will rotate the corresponding drive wheel 30 or 32 relatively faster, whereby the faster rotating wheel will be the outside wheel of the turning maneuver and the stand-on mower will turn in the opposite direction, e.g., a faster rotating right drive wheel 32 will turn the stand-on mower 5 toward the left and vice-versa.

Referring now to FIGS. 2-7, control system 45, at least in combination with riding platform assembly 100, is configured to allow the operator to comfortably operate the mower 5 for extended periods of use. For example, the control system 45 is positioned so that the operator can comfortably grasp the grip portions 62, 64 of handlebar 58 or levers 59A and 59B while standing upon riding platform assembly 100. The particular locations of at least some components of the control system 45 and the riding platform assembly 100 are selected to cooperate with each other, ensuring that the entire bodies of operators remain far enough behind the axis of rotation 53 (FIG. 2) so that their body weights supplement traction of the drive wheels 30, 32.

Furthermore, the riding platform assembly 100 itself can be resiliently mounted to or at least partially isolated from the mower chassis 10 to help dampen shock-type loads or other jarring-type movements from being transferred to the operator during use, explained in greater detail elsewhere herein. In other words, in some embodiments, the riding platform assembly 100 is configured to reduce rider leg and/or other fatigue by damping or otherwise partially absorbing shocks that would otherwise be transferred through the riding platform 100 assembly and into the legs and body of a standing operator.

Continuing to refer to FIGS. 2-7, various manipulatable or movable steering components of control system 45, e.g., grip portions 62, 64, or other portions of handlebar 58 or levers 59A and 59B, can be located rearward of the axis of rotation, throughout their entire respective ranges of motion. This helps ensure that the operator remains positioned behind a zero-turn radius of the lawnmower 5 or axis of rotation of drive wheels 30 and 32 to provide the desired weight distribution and traction supplement thereto.

For example, and referring now to FIGS. 2-5, handlebar 58 can be configured so that, while performing a zero-radius turning maneuver, (i) one of the hand grip portions 62, 64 is in a lead position, adjacent a respective upright 15, and (ii) the other one of hand grip portions 62, 64 is in a trailing position, adjacent the operator's body. During such a maneuver, the hand grip portion 62, 64 in the trailing position creates a physical or mechanical barrier for the operator's body. This ensures that the operator is displaced far enough behind a vertical turning axis, about which the lawnmower 5 rotates while performing a zero-radius turn, supplement traction with his or her own bodyweight by limiting how far forward the operator can be situated.

Referring again to FIGS. 6 and 7, instead of a stabilizing bar 16 that is located near the front of the control system 45 (as seen in FIG. 1), a different stabilizing bar 65 is provide near the back of the control system 45, so that it is positioned entirely behind a zero-turn radius of the lawnmower 5 or axis of rotation 53 (FIG. 2) of drive wheels 30 and 32. For example, stabilizing bar 65 can extend from a rear portion of the upper ends of the uprights 15. Referring again to FIGS. 2-7, the riding platform assembly 100 can be correspondingly configured to ensure that the operator has sufficient room or surface area to stand behind the axis of rotation 53 (FIG. 2) during zero-turn maneuvers, again ensuring that the operator's body weight can supplement traction. Riding platform assembly 100 is also configured to allow operators to readily adjust foot and standing positions while suitably accessing the control system 45 during use of the stand-on mower 5.

The riding platform assembly 100 can include a stationary support assembly 105 that is fixedly attached to and extends at least partially from, e.g., the lawnmower frame 12 or elsewhere on the chassis 10, a main platform 110, opposing sidewalls 130, 140, and an extender 300 detailed below. Main platform 110 serves as the support structure upon which the operator stands during use, either solely or in conjunction with the extender 300, defining a standing portion 114 at its top surface.

Standing portion 114 is displaced longitudinally behind the rotational axis 53 (FIG. 2) sufficiently far to ensure that, during use, operators are far enough away from hydraulic and/or other heat generating components so that their lower bodies will be unaffected by mower-generated heat. As discussed in more detail below, the extent of this spacing preferably can be altered by deploying or retracting the extender 300.

Still referring to FIGS. 2-7, by longitudinally displacing standing portion 114 behind the rotational axis 53 (FIG. 2), the operator's body weight can enhance traction of the drive wheels 30, 32 to a greater extent than if the operator stood at or on the rotational axis. This is because main platform 110 acts as a lever arm for increasing the force applied by the operator's body weight, as a function of the distance between the operator and the rotational axis 53, to the contact patches between the ground and drive wheels 30, 32. In other words, placing the operator on the main platform 110, behind the rotational axis 53, moves the stand-on mower's 5 center of gravity rearward, toward the drive wheels 30, 32. This elevates some of the load-bearing burden from the casters 34, 36 which improves their ability to rotate or "caster" and increases their use life, while increasing the load that the drive wheels 30, 32 must carry and thus increasing their traction. This effect can be increased through the use of the extender 300. It is noted that casters 34, 36 still bear enough load to prevent "wheelies" of the stand-on mower 5, or their removal from the ground during use.

Figure 2:
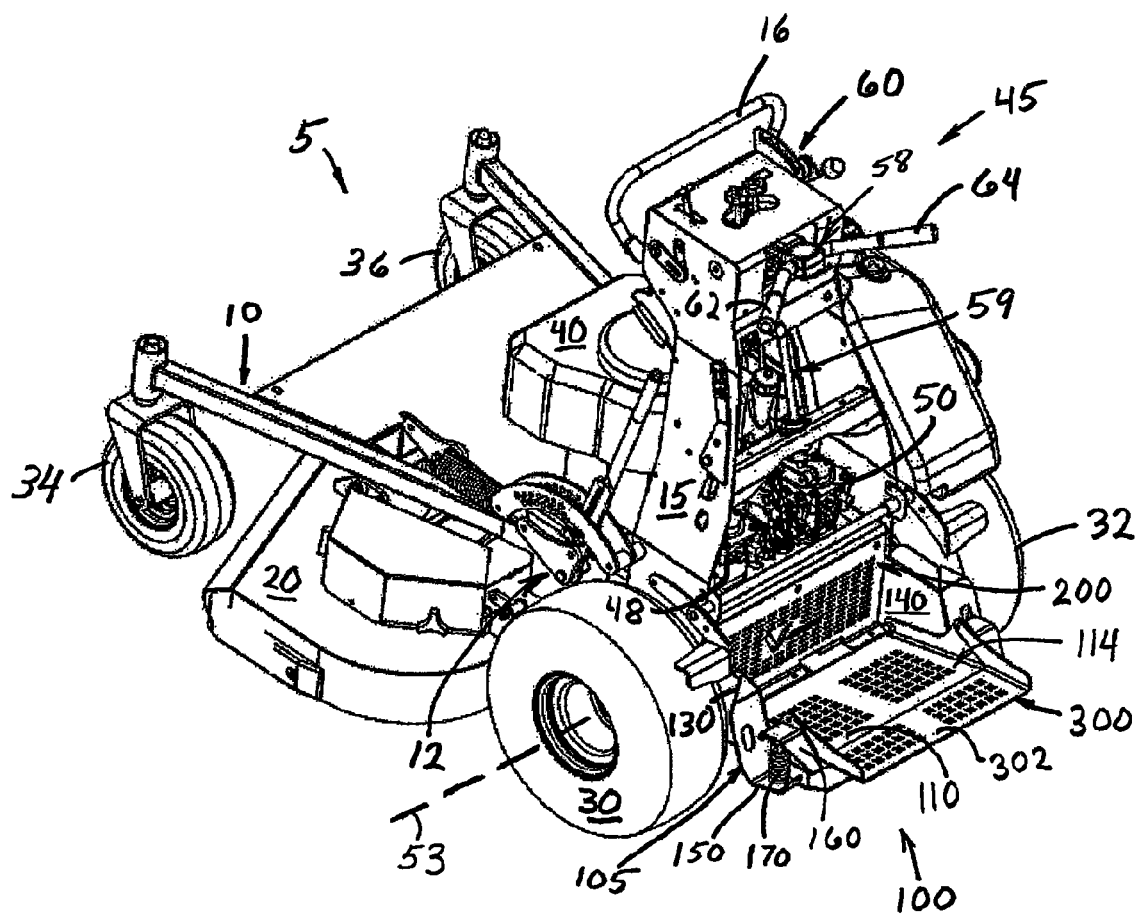
FIG. 2 is an isometric view of the stand-on lawnmower of FIG. 1.
Figure 3:
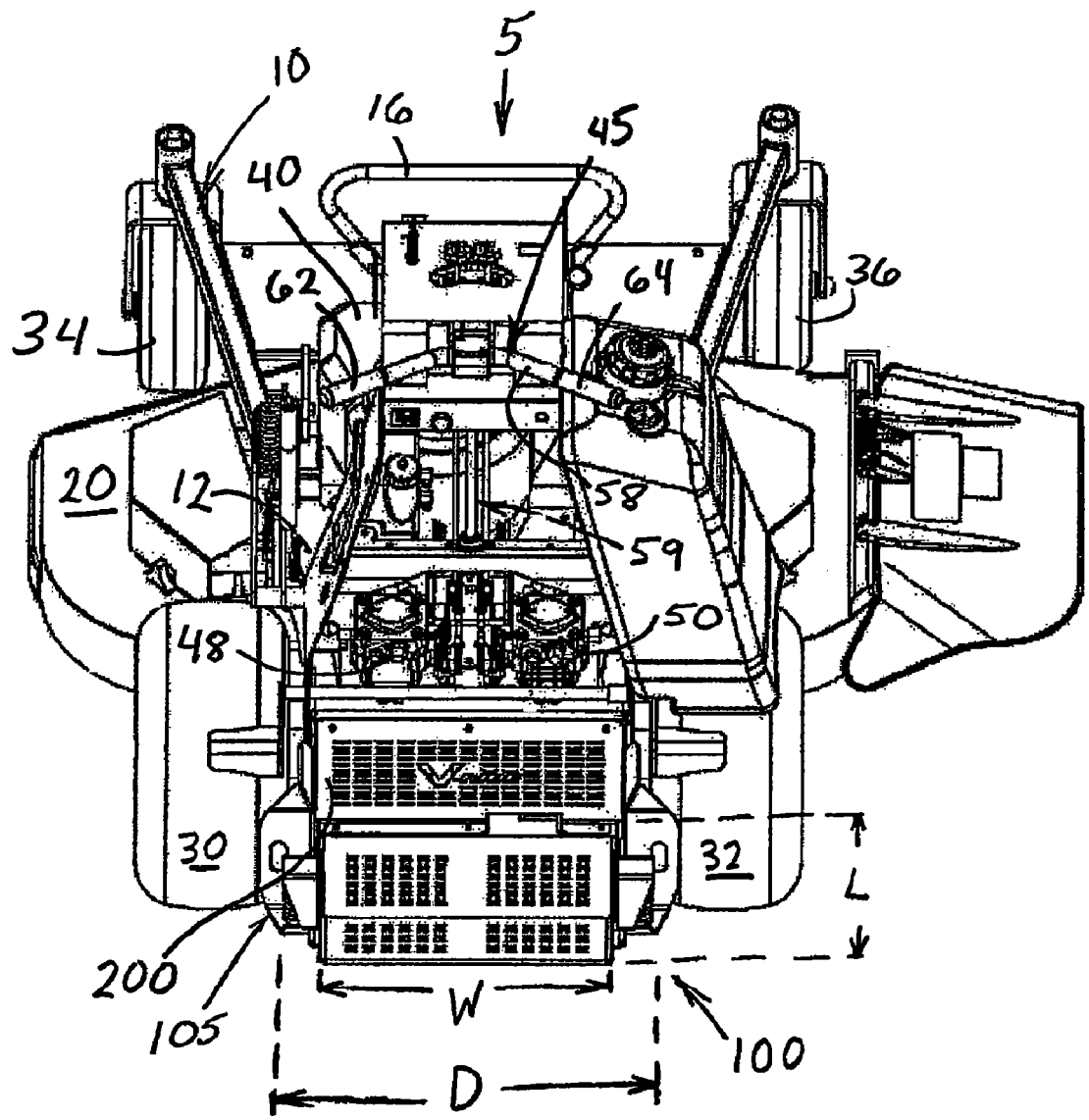
FIG. 3 is a rear elevational view of the stand-on lawnmower shown in FIG. 1.

Still referring to FIGS. 2-7, as for the particular structure of standing portion 114, it can be generally planar, defining a length dimension "L" (FIG. 3) and a width dimension "W" (FIG. 3). The overall surface area of standing portion 114 is sufficiently large to enable operators to balance and stabilize their bodies nearly entirely through their legs and feet, mitigating the need for balancing and stabilizing by way of control system 45. The length dimension "L" (FIG. 3) is large enough so that operators can freely longitudinally adjust their feet positions without being apprehensive of stepping too far rearward, so as to step off the back of the main platform 110, or too far forward so as to be near enough hydraulic or other heat-generating components to sense heat emitted therefrom. It can be lengthened through deployment of the extender 300.

Referring now to FIG. 3, width dimension "W" has a magnitude that closely corresponds to that of the distance "D" between drive wheels 30 and 32. For example, width dimension "W" can be greater than about 80 percent, greater than about 85 percent, greater than about 95 percent, or other percentages of the value of distance "D." Standing portion 114 spans nearly the entire distance between respective innermost portions of drive wheels 30 and 32, while providing adequate clearance between the lateral edges of standing portion 114 and drive wheels 30, 32 to accommodate tire sidewall flexing, bulging, or other characteristics that the drive wheels 30, 32 might exhibit during use. This provides generous room for the operators to laterally adjust their feet positions as desired.

Referring again to FIGS. 2-7, each of sidewalls 130, 140 can have substantially the same height along its entire length. This provides side-oriented physical protection to the feet, ankles, and legs of the operators, shielding them from the rotating drive wheels 30, 32, as well as debris and/or other articles which are encountered while mowing. Furthermore, the sidewalls 130, 140 can be tall enough so that the operators can brace their feet laterally against them, locking or wedging themselves stably into the corner defined at the intersection of the standing portion 114 of main platform 110 and the sidewalls 130, 140. This allows operators to assume wide, stable stances, reducing their reliance on control system 45 for balancing or stabilizing themselves, even while traversing uneven terrain, without apprehension of contacting the rotating drive wheels 30, 32 with their legs.

The sidewalls 130, 140 are positioned to the insides of the drive wheels 30, 32, serving as physical barriers between an operator's feet and the drive wheels 30, 32. Sidewalls 130, 140 extend longitudinally rearward from the frame 12, and outside of and along at least part of the length of main platform 110. Lower parts of the sidewalls 130, 140 can be mounting structure(s) for pivotally attaching the main platform 110 to the remainder of the platform assembly 100.

Referring now to FIGS. 2 and 3, a kick plate or cover plate 200 can be used with platform assembly 100 for ensuring that the operator remains far enough behind the axis of rotation 53 (FIG. 2) of the drive wheels 30, 32 to be unaffected by heat emitted from hydraulic motors 52, 54. Its implementation also ensures that the operator remains far enough behind the axis of rotation 53 to ensure that the body weight of the operator is used to supplement traction of drive wheels 30, 32.

Still referring to FIGS. 2 and 3, cover plate 200 extends across and cover the hydraulic motors 52, 54, optionally also extending upwardly enough to also cover the hydraulic pump 48, 50. In such embodiments, the cover plate 200 can cover the hydraulic motors 52, 54 and pumps 48, 50 as a single unitary piece, or cover them separately as a two-piece cover plate 200 (not shown). Preferably, the cover plate 200 is removably attached to the rearward facing portion of the stationary support assembly 105, the frame 12, and/or uprights 15. Cover plate 200 can be sized to fit snugly between the sidewalls 130, 140 behind the hydraulic motors 52, 54, whereby the cover plate 200 can extend upwardly from an upper surface of main platform 110 toward the bottoms of uprights 15. Referring now to FIGS. 2-9, regardless of the particular configuration of sidewalls 130, 140, the riding platform assembly 100 preferably is configured to reduce operator fatigue by providing suspension-like functionality. Accordingly, the riding platform assembly 100 can dampen or otherwise partially absorb loads that would otherwise be transferred through the riding platform 100 assembly and into the legs and body of a standing operator.

Still referring to FIGS. 2-9, main platform 110 can be suspended from or at least partially movable with respect to the stationary support assembly 105. In other words, the main platform 110 can be at least partially isolated from, resiliently connected to, or dampened with respect to, the stationary support assembly 105. A front portion of the main platform 110 can be pivotally attached to the stationary support 105 or sidewalls 130 140 by, for example, a pair of spaced pivots 212, 214, as shown or, conceivably, by a single hinge extending all or a majority of the transverse width of the main platform 110.

Figure 8:
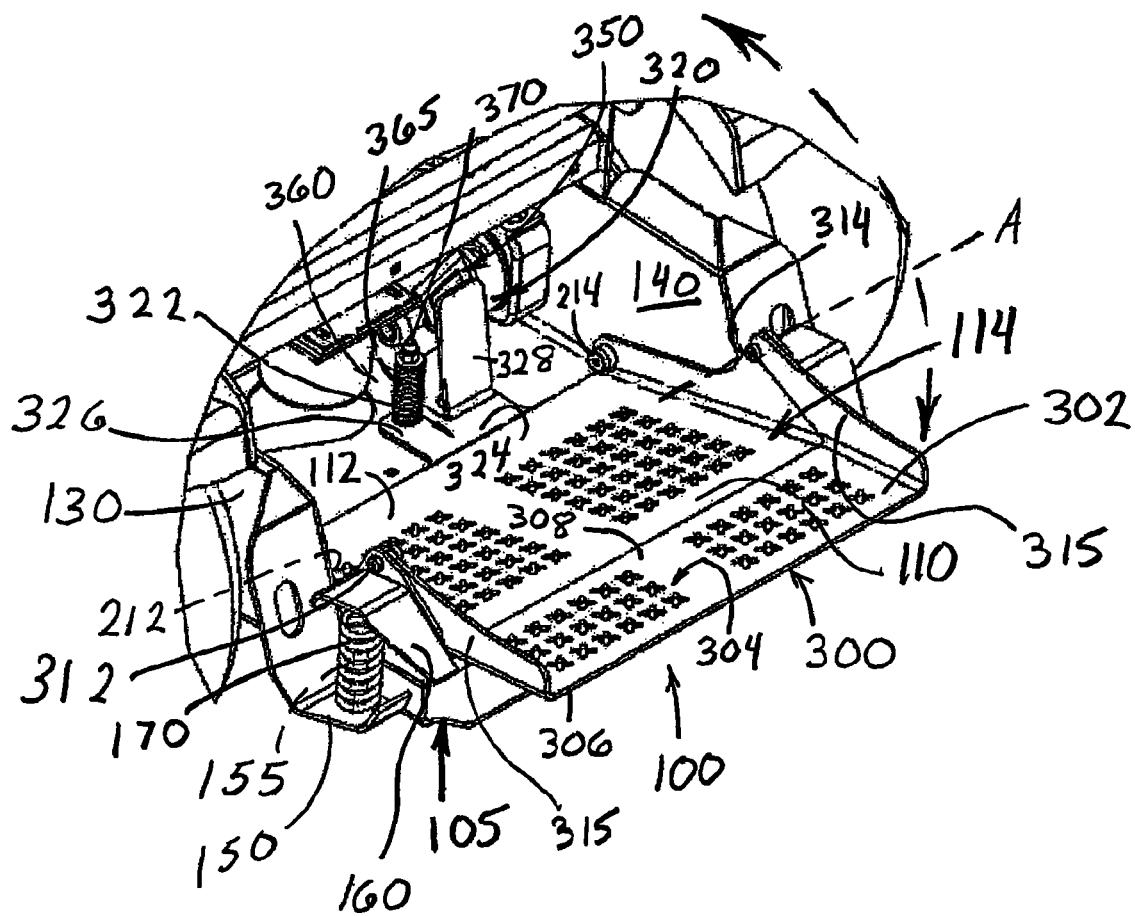
FIG. 8 is a close-up, isometric view of the riding platform of the stand-on lawnmower shown in FIG. 1 with the extender being in its deployed position.
Figure 9:
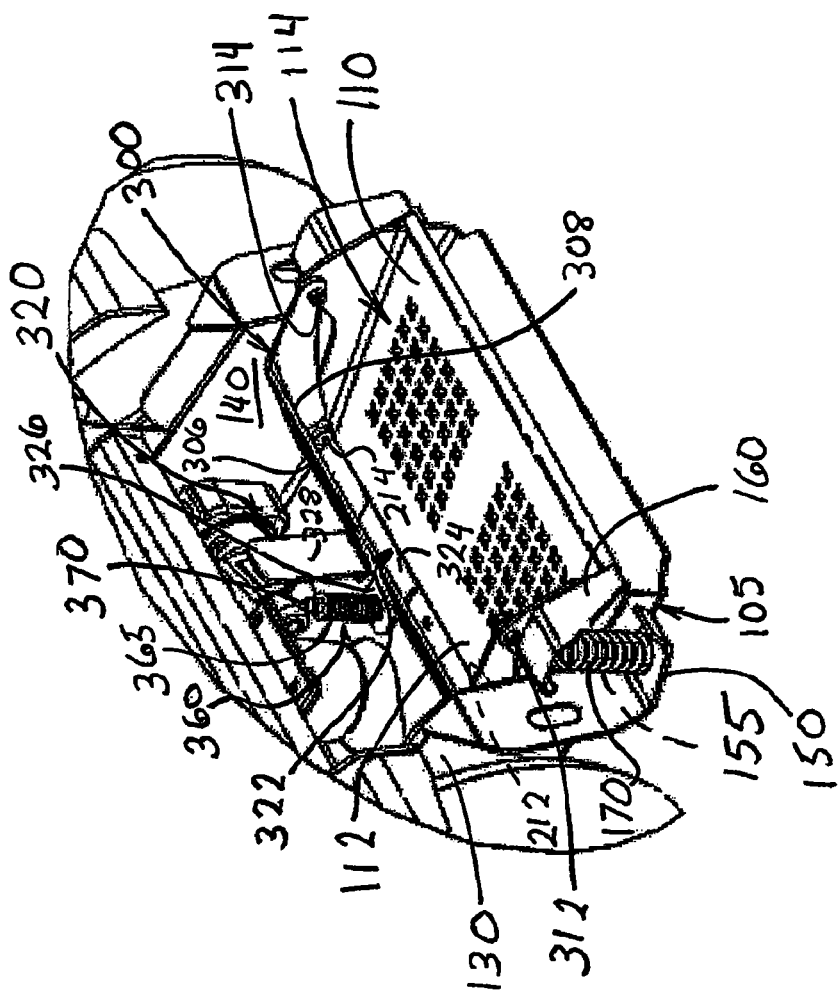
FIG. 9 is a close-up, isometric view of the riding platform of the stand-on lawnmower shown in FIG. 1 with the extender being in its stowed position.

Referring now to FIGS. 8 and 9, the pivots 212, 214 define a pivot axis that extends transversely across the riding platform assembly 100, allowing a rear portion of the main platform 110 to move up and down along an arcuate travel path. Preferably, the rear portion of main platform 110 is configured to resiliently move up and down along an arcuate travel path and dampen loads that are transferred through the riding platform 100 during use. This can be accomplished by a suspension assembly provided between stationary support assembly 105 and main platform 110.

For example, upper and lower spring supports 150 and 160 can be provided on components of the riding platform 100, between which resilient or biasing articulation is sought. As seen in the embodiments of FIGS. 8 and 9, the lower spring support 150 can be fixed to and extend transversely from the stationary support 105. Upper spring support 160 can be attached to and extend transversely from the sidewall 130 of main platform 110, if the sidewall 130 is provided on the main platform 110 itself. Otherwise, the upper spring support 160 can be provided on another portion of the main platform 110, such as a longitudinally extending flange or other suitable structure. The lower and upper spring supports 150, 160 define abutments that capture a spring, preferably, a helical compression spring 170, therebetween.

Referring still to FIGS. 8 and 9, the lower spring support 150 further includes a retaining post 155 that extends upwardly from an upper surface of the spring support 150 and that fits concentrically within the spring 170 to hold the spring 170 in alignment between the upper and lower spring supports 150, 160. Although the upper and lower spring supports 150, 160 are shown as each having a horizontal plate-like middle segment with converging sidewalls that, in combination, define concave surfaces that face respective ends of the spring 170, it is fully appreciated that other suitable configuration will suffice. Such other suitable configuration, include but are not limited to, cylindrical or hemispherical housings with openings that face each other.

Turning again to FIGS. 8 and 9, an extender 300 preferably is provided for selectively extending platform assembly 100. Providing a longer platform assembly permits the operator to stand further behind the turning axis of the lawnmower 5 and, in so doing, achieves at least the following benefits over a shorter platform. Extender 300 can permit a relatively tall operator and/or an operator with relatively long arms to position himself or herself at a position in which the operator can steer with his or her larger arm muscles rather than the smaller wrist or hand muscles. This is especially beneficial in the case of a turning handle-based steering system such as the embodiments incorporating handlebar 58 (FIGS. 1-7). As another example, extender 300 can move the center of gravity of lawnmower 5 further away from the casters 34, 36, placing more weight on the drive wheels 30, 32 and increasing traction. It also balances the weight more uniformly on the front casters 34, 36 and rear wheels 30, 32, making the machines more balanced and making it easier to turn the lawnmower 5.

However, making the extender 300 selectively deployable rather than simply providing a longer platform provides distinct advantages over a longer platform. For instance a selectively deployable extender 300 permits the overall length of the lawnmower 5 to be shortened for transport or storage. Additionally, extender 300 can be retracted for travel on a steep hill or over an obstruction such as a curb so as to avoid engagement with the obstruction and damage to the obstruction or the platform.

The effective length of the platform assembly 100 could be selectively extended using any number of techniques. For instance, a plate or similar structure could simply be bolted on or otherwise removably affixed to the rear end of the main platform 110 in any suitable manner. A plate or similar structure could also be supported by rails or similar structures under the main platform 110. That plate could telescopically move fore and aft relative to the main platform 110. Both of these extenders, however, exhibit the drawback of not being able to bend or pivot once in their deployed position. They, like long platforms, may be damaged upon contact with the ground or another obstruction. For this reason, the extender 300 is preferably, but not necessarily, configured to flex or pivot upon contact with such an obstruction.

Still referring to FIGS. 8 and 9, a preferred embodiment of the extender 300 takes the form of a plate 302 or other structure that has an at least generally planar support surface 304 and that is pivotally attached to the main platform 110. In an especially preferred embodiment, the plate 302 is perforated and of at least generally the same thickness and rigidity as the plate forming standing portion 114 of main platform 110. The extender 300 of this embodiment is nearly as wide as the standing portion 114 and extends sufficiently behind that main platform 110 to permit at least a portion of the operator's feet to be supported on it. In a preferred embodiment, the upper support surface 304 of the plate 302 extends to a rear end 306 located about 3 inches to 5 inches behind the rear end of the main platform 110, and more preferably about 4 inches.

As can be appreciated from FIGS. 8 and 9, the pivot axis "A" (FIG. 8) of the plate 302 is located forwardly of the front end 308 and is vertically spaced from or above the standing portion 114. The pivot axis "A" is defined through a pair of spaced pivots 312, 314 as shown or, conceivably, a single hinge extending all or a majority of the transverse width of the extender 300. The pivots 312, 314 preferably permit uninhibited pivoting of the extender plate 302 from the fully deployed position of FIG. 8, though an intermediate position and to a fully retracted or stowed position of FIG. 9. The pivots 312, 314 can be provided on a pair of longitudinally extending flanges 315 (FIG. 8) that extend adjacent outer edges of the plate 302, extending forward beyond the front of the plate 302. When the extender plate 300 is moved from the fully deployed or extended position (FIG. 8) to the un-deployed, retracted, or stowed position (FIG. 9), the extender 300 is inverted such that a portion of the extender that is positioned rear-most when the extender 300 is in the deployed position (FIG. 8) is positioned forward-most when the extender 300 is in the stowed position (FIG. 9). Preferably, the weight of the extender 300 is enough to suitably maintain it in the inverted, stowed position.

As seen in FIG. 9, when the extender 300 is in such inverted, stowed, position, a then-leading edge of the extender plate 302 sits near the main platform 110, and the rest of the extender plate 302 extends angularly up and back from such (then) leading edge. In this configuration, a clearance is defined between the extender plate 302 and the main platform 110 that is sufficiently large to accommodate operators' feet therein. Stated another way, when the extender 300 is deployed, operators can stand at least partially up on it, and when the extender 300 is stowed, operators can put their toes or at least part of their feet under it while standing upon the main platform 110. Such feature can further provide an ancillary protective feature to, for example, the operators' toes by covering and thus at least partially protecting them from above when the extender 300 is stowed.

Furthermore, stand-on mower 5 can include an operator presence detector or sensor that is preferably provided on, or cooperates with, the main platform 110 and is configured to maintain continued operation of stand-on mower 5 only if the presence of an operator is detected. For example, the main platform 110 can further include a pivoting plate, pedal, or other member that the operator stands on during use. This operator presence detection plate actuates a switch or other device cooperating with such pivoting plate, pedal, or other member, indicating that an operator is present. A preferred plate is discussed below in conjunction with extender 300. It is noted that, as desired, the operator presence detector can be located on other components of the stand-on mower 5, e.g., upon the handlebar 58 or elsewhere.

Turning now to FIGS. 5, 8, and 9, an operator's presence detector 320 of this embodiment includes a presence detection plate 322 that integrally extends from the front of main platform 110. In other words, the main platform 110 includes the presence detection plate 322 so that they can be made from a single piece of material. The desired profile angle of the presence detection plate 322 with respect to the main platform 110 is achieved by bending the presence detection plate 322 upwardly from the front of the main platform 110, defining a sharp bend at their intersection. Presence detection plate 322 has a rear portion 324, a front portion 326, and a tab 328 that extends upwardly and forwardly with respect to the rest of the presence detection plate 322. Tab 328 can also be formed by bending it into the desired angular profile. Tab 328 is aligned with and cooperates with a switch 350 that is provided within a run and/or start electrical circuit of the lawnmower 5. For example, if lawnmower 5 incorporates a magneto based ignition system, the switch 350 can be a normally open switch that interrupts a magneto circuit. In other words, when there is no operator is on the platform assembly 100, then the tab 328 depresses a plunger or button on the switch 350, which shorts-out the magneto circuit, disabling the ignition system and preventing the engine 40 from running.

Still referring to FIGS. 5, 8, and 9, tab 328, when no operator is standing on the platform assembly 100, tab 328 can be maintained against switch 350, holding its plunger or button in a depressed state, whereby the switch 350 functions in a closed manner. Preferably, a spring assembly 360 maintains the switch 350 in a closed position by biasing the front portion 326 of presence detection plate 322 into a resting state position that corresponds to tab 328 engaging the switch 350.

For example, spring assembly 360 can include a helical compression spring 365 and a retaining bolt 370 that is held at a lower end by, for example, the stationary support assembly 105 and at an upper end by a washer and nut. The washer and nut are tightened down upon the retaining bolt 370 sufficiently far to hold the spring 365 in a compressed state so that the entire spring assembly 360 squeezes the presence detection plate 322 downwardly against the stationary support assembly 105 by default.

The spring assembly 360 can cooperate with the suspension system of the platform assembly 100 to hold the main platform 110 up far enough to unload the suspension when the lawnmower 5 is not in use. In other words, in a default position in which no operator is standing upon the riding platform assembly 100, the spring assembly 360 holds the presence detection plate 322 down which correspondingly tilts and holds the main platform 110 up so that the compression springs 170 are unloaded or uncompressed. As seen in FIG. 1, when no operator is standing upon the riding platform assembly 100, the upper spring support 160 can be spaced from an upper end of the compression spring 170 so that the compression spring 170 is completely unloaded.

Referring yet further to FIGS. 5, 8, and 9, when an operator stands upon the main platform 110, the operator's body weight forces the back of main platform 110 down, which correspondingly forces the front of presence detection plate 322 to pivot upwardly. When the presence detection plate 322 pivots upwardly, the tab 328 is pulled away from switch 350, removing the ground circuit from the magneto circuit, and allowing the engine 40 to operate.

In use, when the lawnmower 5 is stored or being transported, the extender 300 typically is pivoted to its stowed position of FIG. 9 in which it is positioned with its (then) front edge sitting above the main platform 110 and having the extender plate 302 extends upwardly and rearwardly approximately 30° to 45°, optionally about 60° or more, beyond the horizontal so that its (then) back edge is vertically spaced from the main platform 110, as described in greater detail elsewhere herein. Pivoting the extender 300 to this position permits the lawnmower 5 to be hauled on a relatively short trailer or truck or stored within a relatively small space in a storage shed or the like.

When an operator desires to operate the lawnmower 5, he or she has the option of either deploying or retracting the extender 300. Deploying extender 300 requires nothing more than pivoting it downwardly to the position shown in FIGS. 1-8. The operator can stand with his or her heels on the extender 300 and toes on the main platform 110, whereby his or her body weight forces the operator presence detection plate 322 away from its horizontal or unoccupied position, into its occupied position to cause the tab 328 to pivot rearwardly to disengage the switch 350 and permit the mower to be operated safely. The operator is now located in a position in which he or she can steer with his or her large arm muscles, even if he or she is relatively tall and/or has long arms. If the extender 300 engages an obstruction or the ground while the lawnmower 5 is traveling with the extender 300 deployed, the extender 300 simply pivots upward, avoiding damage to the extender 300 or the obstruction. It should be noted that the operator need not and often will not prefer to remain in this position at all times. For instance, when the lawnmower 5 is traveling up a steep hill, the operator may wish to move forwardly to maximize the amount of weight placed on the front casters 34, 36.

If, on the other hand, the operator wishes to maintain stationed within the footprint of the main platform 110, he or she can do so simply by pivoting the extender 300 to us fully-retracted or inoperative position as shown in FIG. 9 in which it pivots forwardly and inverts on top of and overlies the main platform 110. He or she can then stand with his or her toes underneath the extender 300 while the presence detection plate 322 of the operator's presence detector 320 remains biased away from its unoccupied horizontal position to cause the tab 328 to pivot rearwardly and disengage the operator presence detection switch 350 to permit the lawnmower to run.

As indicated above, many changes and modifications may be made to the present invention without departing from the spirit thereof. The scope of some of these changes is discussed above. The scope of others is apparent from the appended claims.

What we claim is:

1. A stand-on lawnmower, comprising:
   (A) a frame;
   (B) an engine mounted on the frame;
   (C) a cutter deck supported on the frame and including at least one blade powered by the engine;
   (D) wheels that support the frame and that include at least one driven wheel and at least one steered wheel;
   (E) a steering mechanism that can be manipulated to steer the lawnmower; and
   (F) a riding platform assembly extending rearwardly from the frame and having;
      (i) a stationary support assembly attached to the frame;
      (ii) a main platform operably coupled to the stationary support assembly and presenting a first support surface that is configured to support at least a portion of an operator's weight when the operator is operating the steering mechanism; and
      (iii) an extender that is attached to the main platform and that is selectively deployable to a deployed position to present a second support surface which is located behind the first support surface and on which at least a portion of the operator's weight can be supported when the operator is operating the steering mechanism.

2. The stand-on lawnmower of claim 1, wherein the main platform can pivot with respect to the stationary support assembly.

3. The stand-on lawnmower of claim 2, further comprising a suspension system in which the main platform resiliently moves in response to or dampens use induced loads that are transferred through the riding platform assembly and into legs of a standing operator.

4. The stand-on lawnmower of claim 3, wherein a front portion of the main platform is pivotally attached to the stationary support and a rear portion of the main platform resiliently moves in response to or dampens loads that are transferred through the riding platform during use.

5. The stand-on lawnmower of claim 4, wherein the main platform pivots about an axis that extends transversely across the riding platform assembly, such that the rear portion of the main platform is movable up and down along an arcuate travel path.

6. The stand-on lawnmower of claim 3, wherein the suspension system includes at least one spring that at least partially isolates the main platform from the stationary support assembly.

7. The stand-on lawnmower of claim 6, wherein the spring is a compression spring extending between the stationary support assembly and the main platform.

8. The stand-on lawnmower of claim 7, wherein the stationary support assembly includes a lower spring support extending transversely therefrom and the main platform includes an upper spring support extending transversely therefrom, the lower and upper spring supports retaining the compression spring therebetween.

9. The stand-on lawnmower of claim 8, wherein, in a default position in which no operator is standing upon the riding platform assembly, the upper spring support is spaced from an upper end of the compression spring.

10. The stand-on lawnmower of claim 1, wherein the extender is pivotally attached to the main platform.

11. The stand-on lawnmower of claim 1, wherein the steering mechanism comprises a pair of levers that are moveable with respect to each other for controlling direction and speed of the lawnmower.

12. The stand-on lawnmower of claim 1, wherein the steering mechanism comprises a single handlebar that is movable along multiple axes for controlling direction and speed of the lawnmower travel.

13. The stand-on lawnmower of claim 1, wherein the main platform includes an operator presence detection plate that is pivotally mounted to another portion of the main platform, the operator presence detection plate being pivotable between
  i) an unoccupied position in which the operator presence detection plate is biasingly held in a first position and an operator's absence is detected, and
  ii) an occupied position in which the weight of an operator moves the operator presence detection plate away from the first position and the operator's presence is detected.

14. The stand-on lawnmower of claim 13, wherein the detection circuit includes a switch that is engaged by the operator presence detection plate when the operator presence detection plate is in the first position.

15. The stand-on lawnmower of claim 14, wherein the operator presence detection plate has a tab that extends angularly therefrom, and wherein the switch is selectively engaged by the tab.

16. The stand-on lawnmower of claim 1, wherein the extender is pivotable between
  i) the deployed position, and
  ii) a stowed position in which the extender is inverted and overlies at least a portion of the main platform, and wherein the extender, in the stowed position, is vertically spaced from the main platform such that a clearance between the platform and the extender accommodates at least a portion of an operator's foot therein.

17. A suspension system for use with a stand-on lawnmower, the suspension system comprising:
  (A) a stationary support assembly attached to a frame of a stand-on lawnmower;
  (B) a main platform movable with respect to the stationary support assembly;
  (C) a spring extending between the stationary support assembly and the main platform, the spring at least partially isolating the main platform from the stationary support assembly; and
  (D) an operator presence detector connected to and moving in unison with the main platform, the operator presence detector being movable between
  i) an unoccupied position in which the operator presence detector is biasingly held in a first position, and
  ii) an occupied position in which the weight of an operator moves the operator presence detector away from the first position in response to an operator being supported on the main platform,
  wherein, when the operator presence detector is in the first position and the operator's absence is detected, the spring is spaced from at least one of the main platform and the stationary support assembly.

* * * * *